US007337265B2

(12) United States Patent
Humphrey et al.

(10) Patent No.: US 7,337,265 B2
(45) Date of Patent: Feb. 26, 2008

(54) ORGANIZATION OF CACHE MEMORY FOR HARDWARE ACCELERATION OF THE FINITE-DIFFERENCE TIME-DOMAIN METHOD

(75) Inventors: John R. Humphrey, Hockessin, DE (US); James P. Durbano, Bear, DE (US); Fernando E. Ortiz, Newark, DE (US); Dennis W. Prather, Landenberg, PA (US)

(73) Assignee: EM Photonics, Inc., Newark, DE (US)

( * ) Notice: Subject to any disclaimer, the term of this patent is extended or adjusted under 35 U.S.C. 154(b) by 457 days.

(21) Appl. No.: 10/808,895

(22) Filed: Mar. 24, 2004

(65) Prior Publication Data

US 2005/0120178 A1 Jun. 2, 2005

Related U.S. Application Data

(60) Provisional application No. 60/458,482, filed on Mar. 28, 2003.

(51) Int. Cl.
*G06F 12/08* (2006.01)
(52) U.S. Cl. .............................. 711/5; 708/446; 711/118
(58) Field of Classification Search ...................... None
See application file for complete search history.

(56) References Cited

U.S. PATENT DOCUMENTS

| | | | | |
|---|---|---|---|---|
| 5,497,473 A | * | 3/1996 | Miyoshi et al. | 711/100 |
| 5,951,627 A | * | 9/1999 | Kiamilev et al. | 708/404 |
| 6,279,084 B1 | * | 8/2001 | VanDoren et al. | 711/141 |

OTHER PUBLICATIONS

Durbano, James P., et al., "Hardware Implementation of a Three-Dimensional Finite-Difference Time-Domain Algorithm", IEEE Antennas and Wireless Propagation Letters, vol. 2, 2003, pp. 54-57.*

J.R. Marek, "An Investigation of a Design for a Finite-Difference Time Domain (FDTD) Hardware Acelerator," Air Force Institute of Technology, Wright-Patterson AFB, M.S. Thesis (1991).

J.R. Marek et al., "A Dedicated VLSI Architecture for Finite-Difference Time Domain Calculations," presented at the 8th Annual Review of Progress in Applied Computational Electromagnetics, Naval Postgraduate School, Monterey, California pp. 546-553 (1992).

R.N. Schneider et al., "Application of FPGA Technology to Accelerate the Finite-Difference Time-Domain (FDTD) Method," presented at the 10th ACM International Symposium on Field-Programmable Gate Arrays, Monterey, California, pp. 97-105 (2002).

P. Placidi et al., "A Custom VLSI Architecture for the Solution of FDTD Equations," *IEICE Trans. Electron.*, vol. E85-C, No. 3, pp. 572-577 (Mar. 2002).

* cited by examiner

*Primary Examiner*—Gary Portka
(74) *Attorney, Agent, or Firm*—Connolly Bove Lodge & Hutz LLP

(57) ABSTRACT

Disclosed herein is an organization of cache memory for hardware acceleration of the FDTD method. The organization of cache memory for hardware acceleration of the FDTD method provides a substantial speedup to the finite-difference time-domain (FDTD) algorithm when implemented in a piece of digital hardware. The organization of cache memory for hardware acceleration of the FDTD method utilizes a very high bandwidth dual-port on-chip memory in a particular way. By creating many small banks of internal memory and arranging them carefully, all data dependencies can be statically wired. This allows for a many-fold speedup over SRAM-based solutions and removes the burden of data dependence calculation that streaming SDRAM-based solutions must perform.

15 Claims, 5 Drawing Sheets

ORGANIZATION OF CACHE MEMORY FOR HARDWARE ACCELERATION OF THE FINITE-DIFFERENCE TIME-DOMAIN METHOD

CLAIM FOR PRIORITY

The present application claims priority of U.S. Provisional Patent Application Ser. No. 60/458,482, filed Mar. 28, 2003, the disclosure of which being incorporated by reference herein in its entirety.

STATEMENT OF GOVERNMENT RIGHTS

The United States Government has a paid-up license in the present invention and the right in limited circumstances to require the patent owner to license others on reasonable terms as provided for by the terms of contract No. DAAB07-01-C-L545 awarded by the Night Vision Labs division of the United States Army.

BACKGROUND OF THE INVENTION

A. Field of the Invention

The present invention relates generally to hardware accelerators, and, more particularly to components and methods for facilitating implementation of a finite-difference time-domain (FDTD) hardware accelerator.

B. Description of the Related Art

No longer relegated to radio-frequency (RF) engineers, antenna designers, and military applications, electromagnetic analysis has become a key factor in many areas of advanced technology. From personal computers (PCs) with processor speeds of three (3) gigahertz (GHz) and wireless computer networks, to personal digital assistants (PDAs) with Internet capabilities and the seemingly ubiquitous cell phone, it seems that almost every electronic design now requires electromagnetic characterization. To facilitate this analysis, numerical techniques have been developed that allow computers to easily solve Maxwell's equations.

Maxwell's equations are a system of coupled, differential equations:

$$\nabla \cdot D = q_{ev}$$

$$\nabla \cdot B = q_{mv}$$

$$\nabla \times H = J_i + \sigma E + \frac{\partial D}{\partial t}$$

$$\nabla \times E = -M_i - \frac{\partial B}{\partial t}.$$

As such, they can be represented in difference form, thus allowing their numerical solution. To see this, recall that the definition of the derivative is:

$$f'(x) = \lim_{\Delta x \to 0} \frac{f(x + \Delta x) - f(x)}{\Delta x}.$$

Implementing both temporal and spatial derivatives of Maxwell's equations in difference form produces the numerical technique known as the finite-difference time-domain (FDTD) method. In this approach, a region of interest is sampled to generate a grid of points, hereinafter referred to as a "mesh." The discretized forms of Maxwell's equations are then solved at each point in the mesh to determine the associated electromagnetic fields.

Although FDTD methods are accurate and well-defined, current computer-system technology limits the speed at which these operations can be performed. Run times on the order of hours, weeks, months, or longer are common when solving problems of realistic size. Some problems are even too large to be effectively solved due to practical time and memory constraints. The slow nature of the algorithm primarily results from the nested for-loops that are required to iterate over the three spatial dimensions and time.

To shorten the computational time, people acquire faster computers, lease time on supercomputers, or build clusters of computers to gain a parallel processing speedup. These solutions can be prohibitively expensive and frequently impractical. As a result, there is a need in the art to increase the speed of the FDTD method in a relatively inexpensive and practical way. To this end, people have suggested that an FDTD accelerator, i.e., special-purpose hardware that implements the FDTD method, be used to speed up the computations. (See, e.g., J. R. Marek, *An Investigation of a Design for a Finite-Difference Time Domain (FDTD) Hardware Accelerator*, Air Force Inst. of Tech., Wright-Patterson AFB, M. S. Thesis (1991); J. R. Marek et al., *A Dedicated VLSI Architecture for Finite-Difference Time Domain Calculations*, presented at The 8th Annual Review of Progress in Applied Computational Electromagnetics, Naval Postgraduate School (Monterey, Calif. 1992); R. N. Schneider et al., *Application of FPGA Technology to Accelerate the Finite-Difference Time-Domain (FDTD) Method*, presented at The 10th ACM Int'l Symposium on Field-Programmable Gate Arrays, (Monterey, Calif. 2002); and P. Placidi et al., *A Custom VLSI Architecture for the Solution of FOTO Equations*, IEJCE Trans. Electron., vol. E85-C, No. 3, pp. 572-577 (March 2002)). Although limited success in developing hardware-based FDTD solvers has been shown, the related art still needs a practical, hardware-based solver.

In some conventional hardware implementations of the FDTD method, data is streamed from a SDRAM into the computational logic or is cached into SRAM. "SDRAM" or "synchronous DRAM" is a generic name for various kinds of dynamic random access memory ("DRAM") that are synchronized with the clock speed that the microprocessor is optimized for. "SRAM" or "static RAM" is random access memory ("RAM") that retains data bits in its memory as long as power is being supplied. Unlike DRAM, which stores bits in cells consisting of a capacitor and a transistor, SRAM does not have to be periodically refreshed. SRAM provides faster access to data and is more expensive than DRAM. Most conventional caching and memory organization schemes are general purpose (e.g., the cache hierarchy in a personal computer). However, no caching and memory organization schemes have been developed that work specifically for FDTD method acceleration.

Thus, there is a need in the art to overcome these limitations, and to provide for practical, hardware-based FDTD method accelerators.

SUMMARY OF THE INVENTION

The present invention solves the problems of the related art by providing organization of cache memory for hardware acceleration of the FDTD method. The components and/or methods of the present invention increase the speed of and/or simplify a FDTD hardware implementation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF EMBODIMENTS OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The organization of cache memory for hardware acceleration of the FDTD method of the present invention provides a substantial speedup to the finite-difference time-domain (FDTD) algorithm when implemented in a piece of digital hardware. The present invention is unique because it utilizes very high bandwidth dual-port on-chip memory in a particular way. By creating many small banks of internal memory and arranging them carefully (see FIG. 1, discussed below), all data dependencies can be statically wired. This allows for a many-fold speedup over SRAM-based solutions and removes the burden of data dependence calculation that streaming SDRAM-based solutions must perform.

Figure 1:
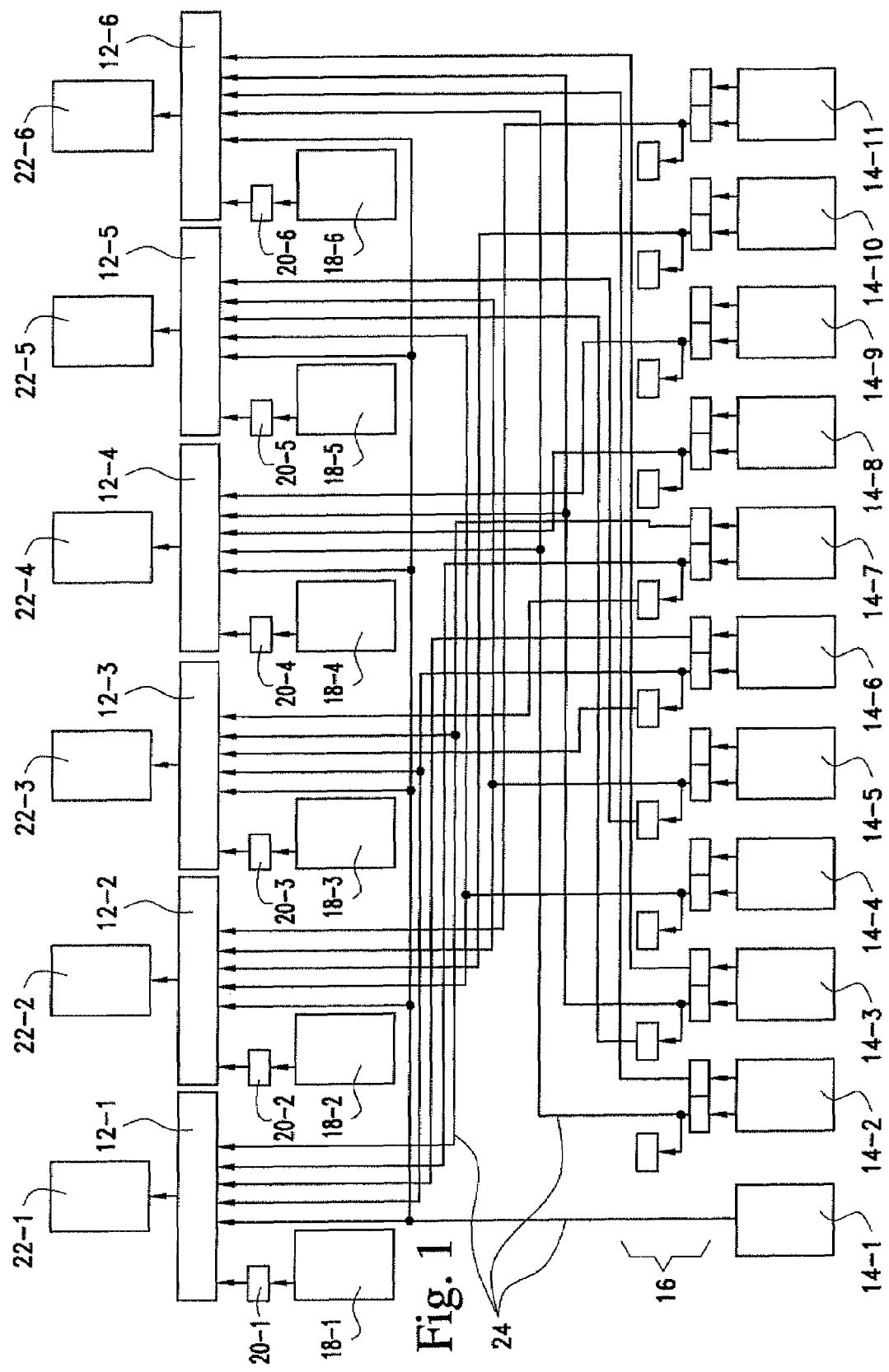
FIG. 1 is a logic diagram showing an FDTD algorithm when using an internal memory organization scheme or system in accordance with an embodiment of the present invention.

With reference to the drawings, FIG. 1 shows a FDTD algorithm when using the internal memory organization scheme or system 10 in accordance with an embodiment of the present invention. Specifically, FIG. 1 shows the routing required to satisfy all data dependencies required by computation engines 21-1 to 12-6. Most of the other labeled blocks in FIG. 1 are the internal memory banks. Scheme 10 includes a plurality of input memory banks 14 that connect to corresponding one-cycle delay elements 16. Delay elements 16, in turn, connect to computation engines 12-1 to 12-6. Another plurality of input memory banks 18-1 to 18-6 connect to computation engines 12-1 to 12-6, via corresponding one-cycle delay elements 20-1 to 20-6. Each computation engine 12-1 to 12-6 connects to a corresponding output memory bank 22-1 to 22-6.

For clarity purposes only a few of the interconnections (or data paths) between the components of internal memory organization scheme 10 are labeled as reference numeral 24 in FIG. 1. Preferably, interconnections 24 electrically and physically couple or connect the components of internal memory organization scheme 10. However, interconnections 24 may be wired, optical, or a similar connection mechanism.

Memory banks 14-1 to 14-11, 18-1 to 18-6, 22-1 to 22-6 represent cache memory, which is very fast random access memory (RAM). Typically, this is built into chips, allowing for much faster access than external DRAM or SRAM. The tradeoff is that it is much smaller, meaning that data can only reside there (i.e., it is "cached") for short periods of time before being placed back into larger storage to make room for newer data. As a microprocessor processes data, it looks first in the cache memory and if it finds data there (from a previous reading of data), it uses that data rather than going to the slower main memory to find it. When data is not found, this is commonly known as a "cache miss", and is very expensive in terms of performance. There is a related phenomenon known as "cache collision" or "thrashing" where certain data competes with other data for a certain location in cache, forcing the processor to repeatedly swap the competing pieces to and from slower memory. The present invention eliminates both of these problems by "prefetching" all required data without conflicts (see blocks 504 and 506 of FIG. 5, discussed below).

Figure 2:
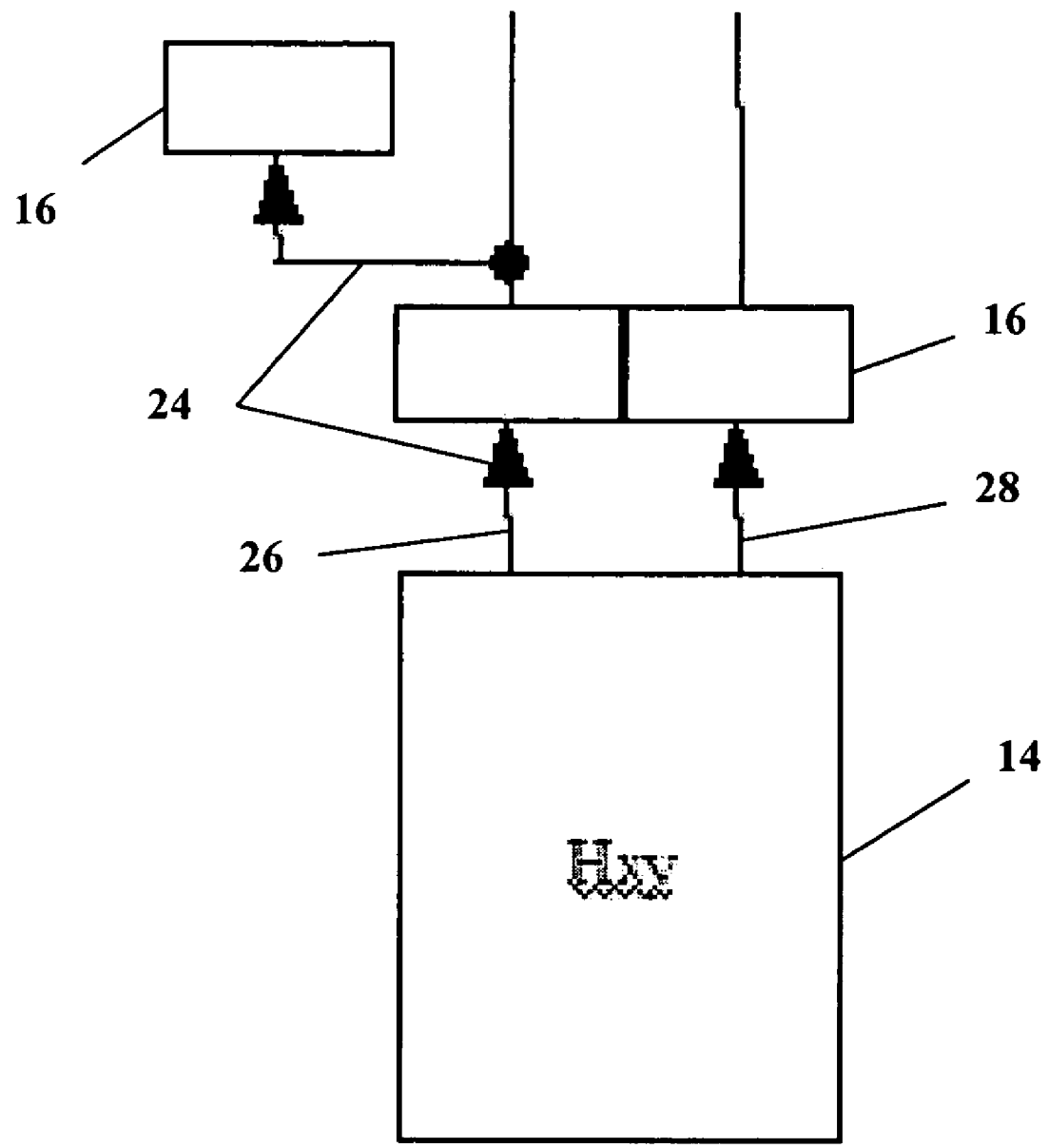
FIG. 2 is a logic diagram showing an exploded view of one of the memory banks of the internal memory organization scheme shown in FIG. 1.

Delay elements 16, 20-1 to 20-6 include a circuit that produces an output waveform similar to its input waveform, only delayed by a certain amount of time. Delay elements 16, 20-1 to 20-6 may thus include flip-flop chains (or shift registers), transmission gate based delay elements, cascaded inverter based delay elements, voltage-controlled based delay elements, etc. FIG. 2 shows an enlarged view of one of input memory banks 14 of the internal memory organization scheme 10. The smaller elements represent one-cycle delay elements 16, 20-1 to 20-6. Since each input memory bank 14-2 to 14-11 is dual-ported, there are two separate data paths 26,28 exiting each input memory bank 14-2 to 14-11 and entering delay elements 16.

Computation engines 12-1 to 12-6 include logic circuitry that takes data from input memory banks 14-1 to 14-11, 18-1 to 18-6 and delay elements 16, 20-1 to 20-6 perform FDTD calculations on this data, and outputs the results to output memory banks 22-1 to 22-6.

Although the internal memory organization scheme 10 of FIG. 1 shows distinct numbers of memory banks 14-1 to 14-11, 18-1 to 18-6, 22-1 to 22-6, delay elements 16, 20-1 to 20-6 and computation engines 12-1 to 12-6, the present invention is not limited to these distinct numbers. Rather, the internal memory organization scheme 10 may include more or less memory banks 14-1 to 14-11, 18-1 to 18-6, 22-1 to 22-6, delay elements 16, and computation engines 12-1 to 12-6 than are shown in FIG. 1.

Figure 3:
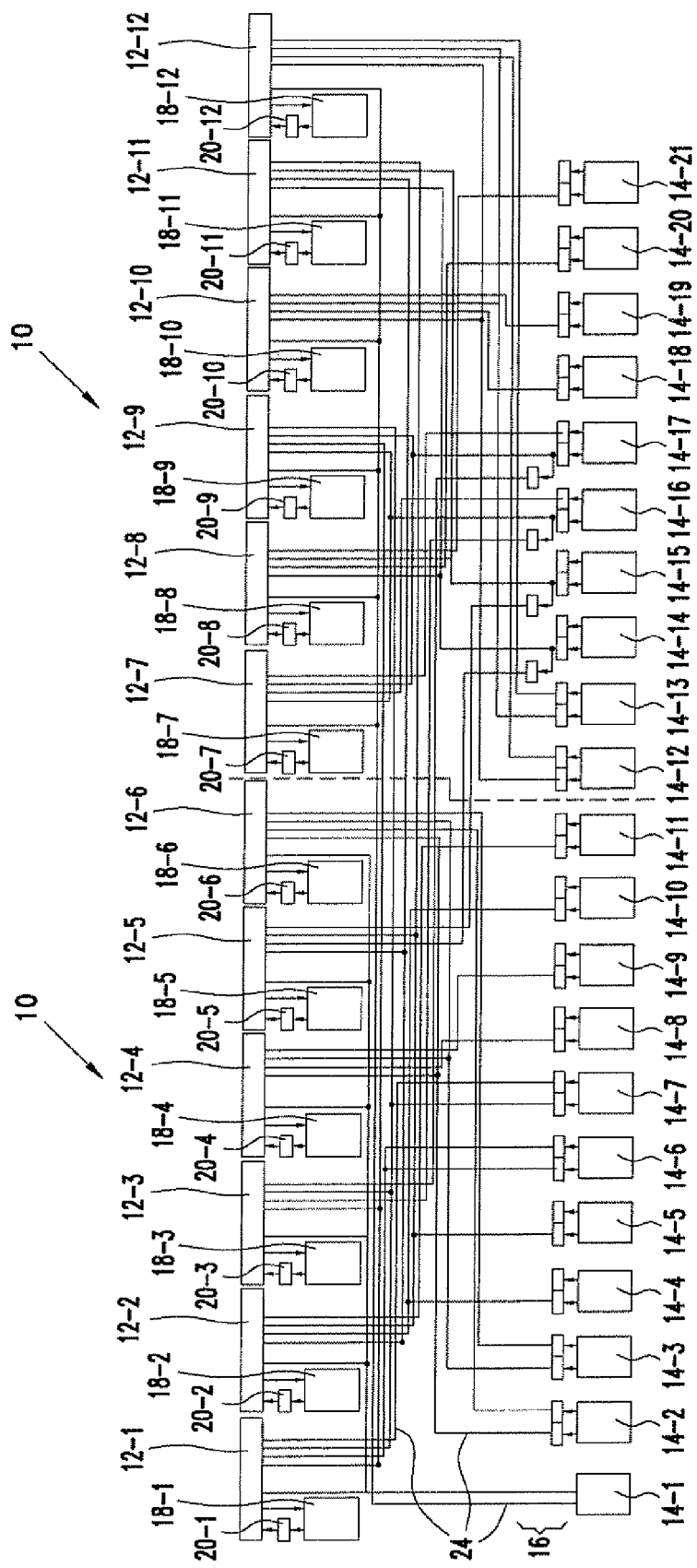
FIG. 3 is a logic diagram showing a plurality of the internal memory organization schemes shown in FIG. 1.

Alternatively, as shown in FIG. 3, a plurality of the internal memory organization schemes shown in FIG. 1 may be used. This FIG. shows the expandability of the present invention. Specifically, FIG. 3 shows the routing required to perform twice as many FDTD equations simultaneously. However, this design requires twice as much on-chip memory as the previous design shown in FIG. 1. This idea can be expanded to consume as many resources as the chip provides.

Figure 4:
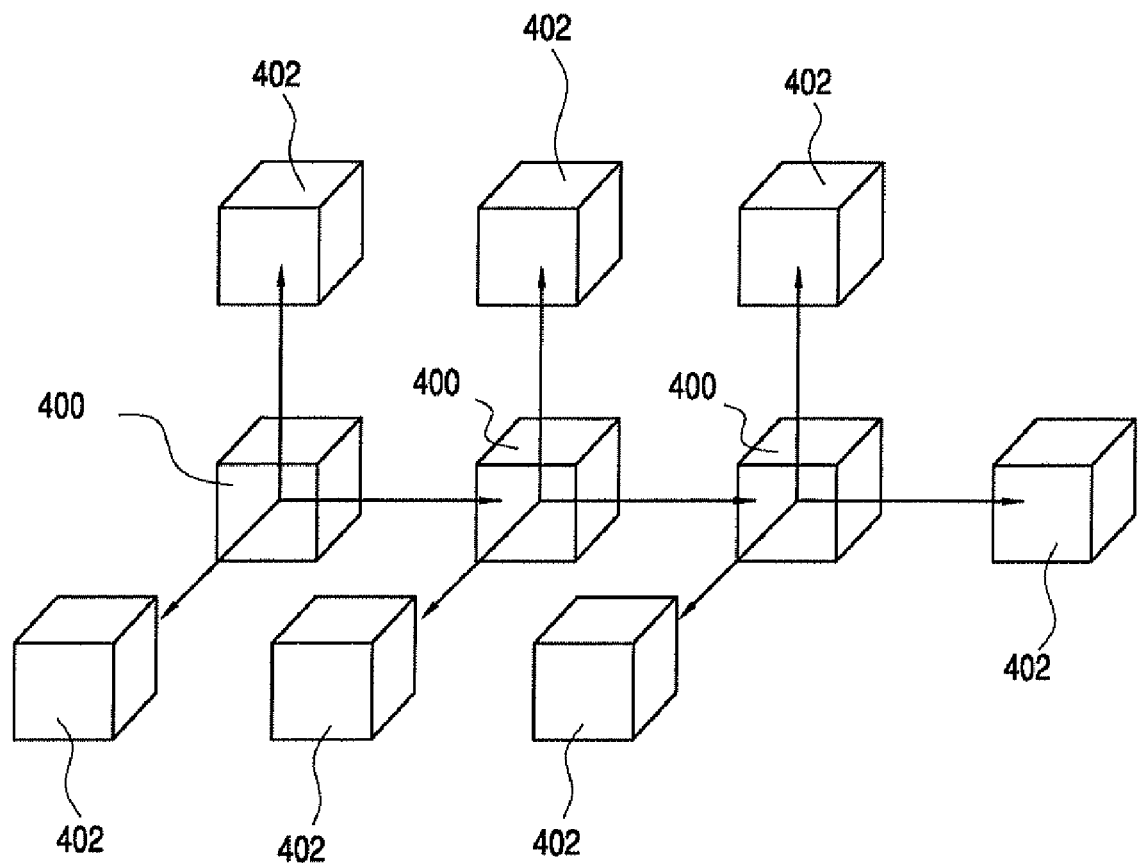
FIG. 4 is a diagram illustrating the direction of data dependencies in the Cartesian directions (x, y, z), which data dependencies are capable of being mapped in the internal memory organization scheme shown in FIG. 1.

The FDTD method centers around repeatedly solving twelve equations of the form $Field_{updated}=C_1*Field_{previous}\pm C_2*[Dual_1-Dual_2+Dual_3-Dual_4]+Source$, at each point in a three-dimensional space. The computational hardware may be derived in a straightforward manner from the equations, but it is difficult to efficiently fetch the data from mass storage. When the FDTD method uses a three-dimensional mesh, the fields labeled "Dual" in the previous equation are located at the current and immediately neighboring nodes in any of the Cartesian directions (x,y,z). As shown in FIG. 4, updating a specific node 400 requires values from that specific node 400, as well as neighboring nodes 402 pointed at by arrows. This poses a significant problem because DRAM, the typical location for storage of field data, is a one-dimensional array. Mapping a three-dimensional space into a one-dimensional storage media means that no storage pattern exists such that all required data for a given equation can be collocated (set or arranged in a place or position). Scattered data typically causes poor performance for DRAM. Because FDTD is a memory-intensive application, poorly performing memory directly leads to poor overall system performance. The present invention thus significantly decreases the DRAM bottleneck by creating a very efficient caching scheme, arranged as very small memory banks 14 of FPGA (field programmable gate array) internal memory. Each memory bank 14 contains one field type (i.e., $H_{zx}$, etc).

The preferred embodiment of the present invention uses the internal, dual-port memory banks 14-1 to 14-11 available in modern FPGA chips, but it may be built from other internal memory resources. The system 10 operates by fetching data from DRAM, which is then stored in internal cache and used in the FDTD calculations. The amount of data fetched at one time is referred to hereinafter as a "chunk" and contains all the values needed to perform a certain number of calculations. This is an efficient use of DRAM because data is highly collocated, meaning that it can be streamed effectively. To see the operation of this system, the data dependences in each of the three Cartesian directions are examined to show that they are satisfied.

Data dependencies in the "i" direction are easy to solve because the classic FDTD implementation iterates over the "i" direction. The dependence can be satisfied by using a delay element to convert a spatial dependence into a time dependence, assuming that the order of iteration is in the "i" direction and flows against the direction of the dependence. To illustrate this, consider the $H_{zx}$ term of the $E_{yx}$ equation. When working on node (i,j,k), both $Hzx|_{i,j,k}$ and $Hzx|_{i-1,j,k}$ are required. On the previous cycle (i−1,j,k), both $Hzx|_{i-1,j,k}$ and $Hzx|_{i-2,j,k}$ were required. If this pattern continued over many cycles, a single piece of data and a delayed copy of the data can satisfy this relation.

Data dependencies in the "j" direction cannot be handled in the same way as those in the "i" direction because the time delay would be much too long. Hundreds of cycles of delay could be required because the repetition interval would be based on row length, and this is expensive in terms of space requirements in FPGAs. An easy alternative to this is to use the second port of the internal dual-port memory banks 14-1 to 14-11. This bank can be addressed independently, and can therefore provide any required data in this direction.

Data dependencies in the "k" direction cannot be handled by either of the previous techniques. The time-delay technique is invalid for the same reasons it was invalid in the "j" direction, i.e., the delay would be too long. The easiest solution is to add extra memory banks 18-1 to 18-6 for specially storing fields required by dependencies in the "k" direction.

Applying all the techniques discussed above, the system or scheme 10 of the present invention includes: one memory bank 14-1 to 14-11 for each field type, and one memory bank 18-1 to 18-6 for any field that shows dependence in the "k" direction. One of the channels on each memory bank 14-2 to 14-11 will have a delay element 16 attached thereto, allowing it to handle fields with no direction dependence as well as those with "i" dependencies, and the other channel on each memory bank 14-1 to 14-11 will be used for "j" dependencies. One extra set of memory banks 22-1 to 22-6 may be used to buffer updated fields before they are stored back to bulk memory.

With this arrangement, when the memory banks are presented with a given read address, a known set of data will be available on the output ports of the memory banks. This data is enough to satisfy the requirements of six or more FDTD equations. The computational hardware can simply draw from the banks that are presenting the appropriate data. If computational hardware is dedicated to a particular equation, its required data will always be found in the same place. Thus, the data dependencies for the equations may be statically wired, saving expensive switching logic.

A large optimization may be made with the observation that the FDTD equations for the electric and magnetic fields are exact duplicates of one another, but with the field types switched. Using this fact, the number of memory banks can be reduced by a factor of two. They will be hereafter referred to as "primary" (denoted as "P(i,j,k)") memory banks, the field type that is being computed, and "dual" (denoted as "D(i,j,k)") memory banks, the complimentary field type to the primary memory bank.

Figure 5:
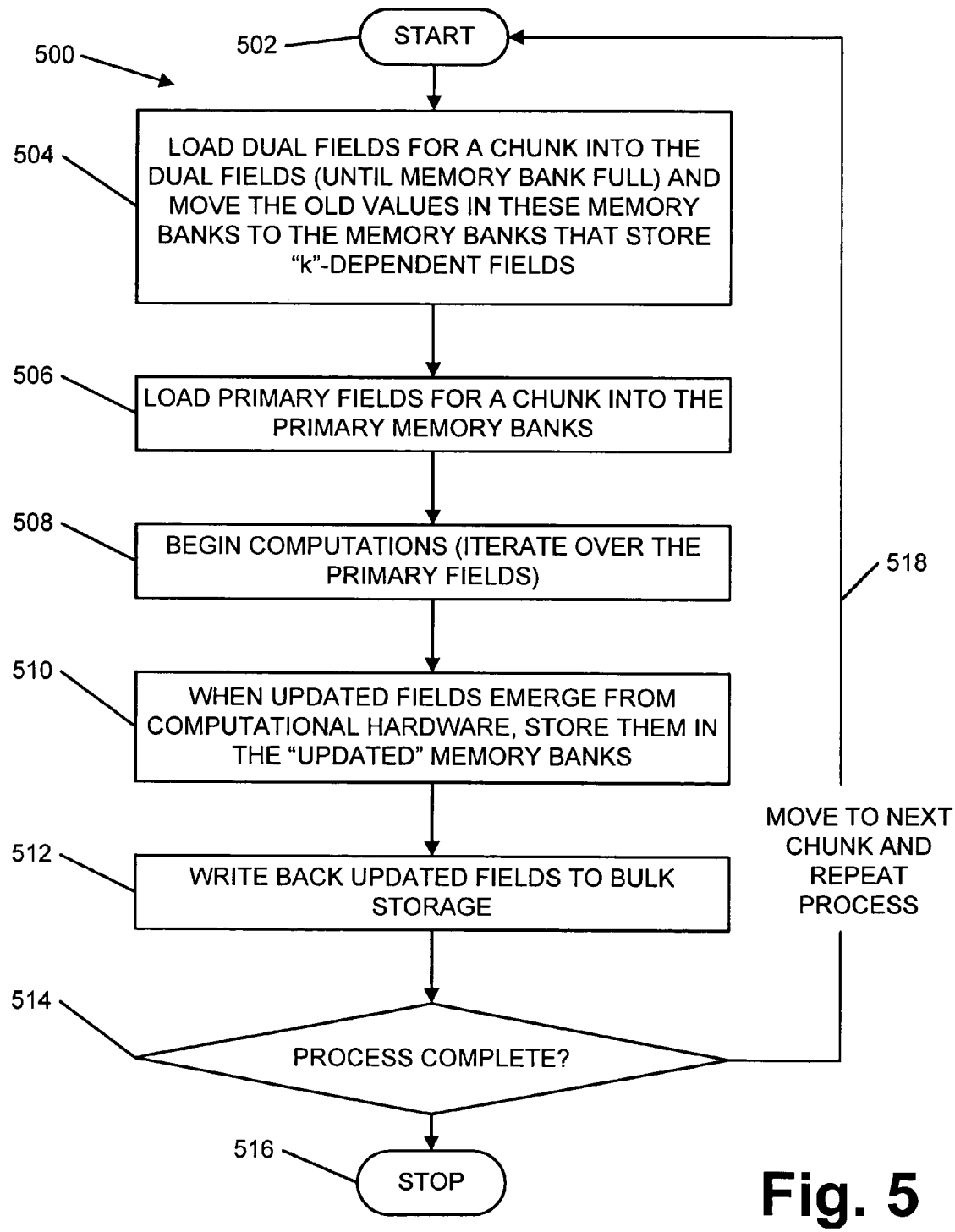
FIG. 5 is a flow chart showing the method of using internal memory organization scheme shown in FIG. 1.

The method for using the internal memory organization scheme 10 of the present invention is shown generally in FIG. 5 as reference numeral 500. The method 500 staffs at step 502 and includes a step 504 of loading dual fields for a chunk into the dual field memory banks 14-1 to 14-11 (until the memory banks are frill). While this is happening, the old values in these dual field memory banks 14-1 to 14-11 are moved to memory banks that store k-dependent fields. A next step 506 includes loading primary fields for a chunk into the primary memory banks 18-1 to 18-6 (this will be smaller than the dual fields by one row length). In step 508, computations begin and iterate over the primary fields. Step 510 includes store updated fields in the "updated" memory banks 22-1 to 22-6 when updated fields emerge from computational hardware 12-1 to 12-6. Step 512 includes writing back updated fields to bulk storage. Step 514 checks to see if method 500 is complete. If method 500 is complete, the process stops at step 516, otherwise the process moves to next chunk of data and repeats method 500.

The organization of cache memory for hardware acceleration of the FDTD method of the present invention has immediate benefits in the field of computational electromagnetics because it aids the design of very fast hardware solvers for the FDTD method. In addition to the FDTD algorithm, the present invention could be used in hardware accelerators for other numerical algorithms that use similar equations (e.g., heat transfer, fluid dynamics, etc.).

The present invention further provides the following advantages over conventional solutions. A complex, internal caching system that minimizes the bandwidth required from external memory. Delay elements may also be employed to convert spatial dependencies into time dependencies. The three-dimensional computational space is iterated in a novel order. Finally, the present invention provides a significant performance improvement over current desktop computers.

It will be apparent to those skilled in the art that various modifications and variations can be made in the internal memory organization scheme of the present invention and in construction of the scheme without departing from the scope or spirit of the invention. Examples of which have been previously provided.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for organizing cache memory for hardware acceleration of an FDTD method in a dual-port on-chip memory, comprising:
   providing a first plurality of dual-port input memory banks that connect to corresponding one-cycle delay elements;
   connecting the delay elements to corresponding computation engines;
   providing a second plurality of input memory banks that connect to second set of one-cycle delay elements;
   connecting the second set of one-cycle delay elements to the corresponding computation engines;
   and connecting the computation engines to corresponding output memory banks,
   wherein said connecting steps route data dependent on direction from said memory banks to the corresponding computation engines when each read address is present to said memory banks.

2. A method for organizing cache memory as recited in claim 1, wherein the first plurality of dual-port input memory banks handles fields having i and j directional dependencies.

3. A method for organizing cache memory as recited in claim 2, wherein each of the first plurality of dual-port input memory banks includes a first port that handles fields having i directional dependencies, and a second that handles fields having j directional dependencies.

4. A method for organizing cache memory as recited in claim 1, wherein the second plurality of input memory banks handles fields having k directional dependencies.

5. A method for organizing cache memory as recited in claim 1, wherein the output memory banks buffer updated fields before storing the updated fields to a bulk memory.

6. A method for organizing cache memory as recited in claim 1, wherein at least six output memory banks are provided.

7. An organization scheme of cache memory for hardware acceleration of an FDTD method in a dual-port on-chip memory, comprising:
   a first plurality of input memory banks connected to corresponding one-cycle delay elements;
   a plurality of computation engines connected to corresponding delay elements;
   a second plurality of input memory banks connected to a second set of one-cycle delay elements;
   connecting to the corresponding computation engines; and
   a plurality of output memory banks and the second set of one-cycle delay elements connected to an output and an input, respectively, of the corresponding computation engines,
   wherein said connecting steps route data, dependent on direction, from said memory banks to the corresponding computation engines when each read address is presented to said memory banks.

8. An organization scheme of cache memory as recited in claim 7, wherein the first plurality of input memory banks handles fields having i and j directional dependencies.

9. An organization scheme of cache memory as recited in claim 8, wherein each of the first plurality of input memory banks includes a first channel that handles fields having i directional dependencies, and a second channel that handles fields having j directional dependencies.

10. An organization scheme of cache memory as recited in claim 7, wherein the second plurality of input memory banks handles fields having k directional dependencies.

11. An organization scheme of cache memory as recited in claim 7, wherein each of the plurality of output memory banks buffer update fields before storing the updated fields to a bulk memory.

12. An organization scheme of cache memory as recited in claim 7, wherein the plurality of output memory banks comprises at least six output memory banks.

13. A method of using an organization scheme of cache memory for hardware acceleration of an FDTD method in a dual-port on-chip memory, comprising:
   loading dual fields of data into the first plurality of input memory banks, and simultaneously moving old values in the first plurality of input memory banks to the second plurality of input memory banks;
   loading primary fields of data into the second plurality of input memory banks;
   beginning computations and iterating over the primary fields of data with the plurality of computation engines;
   storing updated fields in the plurality of output memory banks when updated fields emerge from plurality of computation engines; and
   writing updated fields to bulk storage,
   wherein the organization scheme further comprises a first plurality of dual-port input memory banks connected to corresponding one-cycle delay elements, a plurality of computation engines connected to corresponding delay elements, a second plurality of input memory banks connected to corresponding computation engines, and a plurality of output memory banks connected to corresponding computation engines.

14. A method of using an organization scheme of cache memory as recited in claim 13, wherein the loading dual fields for data into the first plurality of input memory banks continues until the first plurality of input memory banks are full.

15. A method of using an organization scheme of cache memory as recited in claim 13, further comprising: determining whether the method is complete, wherein if the method is complete, the method stops, otherwise the method moves to the next data and repeats.

* * * * *